US005501019A

United States Patent [19]

Concari et al.

[11] Patent Number: 5,501,019

[45] Date of Patent: Mar. 26, 1996

[54] MEASURING AND DRAWING INSTRUMENT

[75] Inventors: Gabriel E. Concari; Rhonda M. Westberg, both of Madison, Wis.

[73] Assignee: Fiskars Inc., Wausau, Wis.

[21] Appl. No.: 403,395

[22] Filed: Mar. 14, 1995

Related U.S. Application Data

[62] Division of Ser. No. 163,268, Dec. 6, 1993, Pat. No. 5,426,859.

[51] Int. Cl.$^6$ .......... G01B 3/04

[52] U.S. Cl. .......... 33/494; 33/492; 33/679.1

[58] Field of Search .......... 33/492, 403, 426, 33/483, 494, 679.1, 565, 758, 759, 564

[56] References Cited

U.S. PATENT DOCUMENTS

| | | | |
|---|---|---|---|
| 2,561 | 4/1842 | Card . | |
| D. 135,282 | 3/1943 | Green | D10/65 |
| D. 142,051 | 8/1945 | White | D10/64 |
| 165,519 | 7/1875 | Swasey | 33/422 |
| 570,977 | 11/1896 | Belcher . | |
| 706,242 | 8/1902 | Latshaw | 33/494 |
| 774,365 | 11/1904 | Phenix . | |
| 1,001,229 | 8/1911 | Stuart | 33/415 |
| 1,327,154 | 1/1920 | Golden | 33/27.03 |
| 1,334,145 | 3/1920 | Eaton | 33/483 |
| 1,576,800 | 3/1926 | Tibony | 33/27.03 |
| 1,631,731 | 6/1927 | Johnson | 33/483 |
| 1,776,245 | 9/1930 | Barrett | 33/494 |
| 1,825,266 | 9/1931 | Fischer | 33/27.03 |
| 2,054,420 | 9/1936 | Hochman | 33/495 |
| 2,507,073 | 5/1950 | White . | |
| 2,537,473 | 1/1951 | McCusker | 33/27.03 |
| 2,554,099 | 5/1951 | Ermold | 33/783 |
| 2,612,690 | 10/1952 | Cotton | 33/27.03 |
| 2,958,132 | 11/1960 | Hartbauer | 33/27.03 |
| 3,015,889 | 1/1962 | Godman | 33/27.03 |
| 3,140,548 | 7/1964 | Paparozzi | 33/564 |
| 3,263,334 | 8/1966 | Mutter | 33/27.03 |
| 3,381,384 | 5/1968 | Souza | 33/564 |
| 3,474,538 | 10/1969 | Kirkegaard | 33/27.03 |
| 3,791,036 | 2/1974 | Stober, Jr. | 33/27.03 |
| 4,149,320 | 4/1979 | Troyer et al. | 33/758 |
| 4,267,638 | 5/1981 | Heinz | 33/27.03 |
| 4,353,166 | 10/1982 | Kettlestrings | 33/27.03 |
| 5,125,161 | 6/1992 | Guthrie | 33/27.03 |
| 5,240,338 | 8/1993 | Jye | 33/27.03 |

FOREIGN PATENT DOCUMENTS

| | | | |
|---|---|---|---|
| 0056864 | 4/1911 | Switzerland | 33/27.03 |

OTHER PUBLICATIONS

Popular Mehanics, Apr. 1949, p. 141.

*Primary Examiner*—Christopher W. Fulton
*Attorney, Agent, or Firm*—Foley & Lardner

[57] ABSTRACT

An instrument for performing various drawing and measurement functions is disclosed. The instrument includes an elongated plate having a straight edge and a measurement region. A protractor plate is connected to the elongated plate and cooperates with a rotatable center dial for the drawing and measuring of angles. The instrument also preferably includes holes through the elongated plate. The holes are configured to receive a marking instrument so the device can be used as a compass. Additionally, an attachment region allows the instrument to be held in a conventional ring binder.

11 Claims, 2 Drawing Sheets

MEASURING AND DRAWING INSTRUMENT

This is a Divisional of Ser. No. 163,286 filed Dec. 6, 1993, now U.S. Pat. No. 5,426,859 issued on Jun. 27, 1995.

FIELD OF THE INVENTION

The present invention relates generally to instruments for measuring and drawing, and particularly to instruments designed to simplify certain measuring and drawing activities.

BACKGROUND OF THE INVENTION

Various measuring and drawing tasks are performed by people from all walks of life, e.g. draftsmen, designers, engineers, artists, and children learning geometry. A wide variety of instruments exists to assist such people in performing the various drawing and measurement tasks. Examples of these instruments include compasses, straight edges, rulers, protractors, templates, and french curves. Thus, performance of numerous measuring and drawing tasks has required both proficiency at using a variety of instruments and the physical collection of such instruments.

Sometimes the functions of different instruments have been combined into a single instrument. For example, some devices combine a straight edge, ruler, and template. Other devices combine compasses, straight edges, and rulers by using a disk rotatably mounted in a rigid sheet. The rigid sheet includes a straight edge having markings for drawing straight lines or measuring between points. The sheet and disk further include holes for receiving a writing instrument to form arcs and circles as with a compass. For instance, a user would hold the rotatable disk over a pad of paper, insert a writing instrument into one of the holes in the rigid sheet, and rotate the sheet and writing instrument about the disk to form a constant radius arc. One problem with such devices is the relatively limited number of functions that can be performed. For example, precise angles cannot be measured and drawn. Other disadvantages include the complexity of some devices, particularly if such devices are to be used as educational tools for children.

Still other devices, such as that disclosed in Kirkegaard, U.S. Pat. No. 3,474,538, have a single plate configured to perform the functions of straight edge, ruler, template, protractor, and compass. Although such a device can be used for a variety of functions, it cannot be used as easily or as accurately as often desired. Again, this is particularly true if the device is to be used by children learning to draw and measure various geometrical configurations. Also, the Kirkegaard device does not include a rotatable dial or disk to help a user draw both arcs and angles.

Another common problem with existing designs is the crowding of components and the difficulty in perceiving the meaning of the various scales and marks. A person experienced in the use of rulers, protractors, and compasses would be able to understand and use at least some of the existing devices, but it would be more difficult for others, such as children learning geometry. Another problem is the lack of visual indicators to teach the importance of various functions, numbers, and scales.

It would be advantageous to have a device which combines various measuring and drawing functions while maintaining an understandable and usable overall design.

SUMMARY OF THE INVENTION

The present invention features an instrument designed to facilitate drawing and measuring on a surface. The instrument comprises an elongated plate including a measurement zone having a straight edge to aid in marking straight lines on the surface. The elongated plate also includes visible gradations disposed in the measurement zone generally along the straight edge.

In one embodiment of the invention, a protractor plate is attached to the elongated plate and has a circular center opening defined by a circular edge. The protractor plate includes a series of indicator marks disposed in spaced relationship to one another generally along the circular edge. A center dial is rotatably mounted in the circular center opening of the protractor plate. The center dial has a center point and an outer periphery adjacent the circular edge. An alignment mark is disposed on the center dial in proximity to the outer periphery for alignment with selected indicator marks along the circular edge. An elongated slot is disposed through the center dial and extends from the center point towards the alignment mark. The elongated slot has a generally straight guide edge to facilitate the marking of generally straight lines on the surface intermediate the center point and the outer periphery. Thus, to create an angle, the alignment mark is aligned with an indicator mark and a line is drawn along the straight guide edge. The center dial is then rotated until the alignment mark is aligned with another desired indicator mark. A second line is then drawn along the straight guide edge, leaving two lines, forming a desired angle.

According to another embodiment, the invention features an instrument for measuring and drawing straight lines. The instrument comprises an elongated member having first and second straight edges generally parallel with one another. The instrument includes a first measurement region disposed along the first generally straight edge and including a first series of measurement marks. A second measurement region is disposed along the second generally straight edge and includes a second series of measurement marks. A visual indicator is affixed in the first measurement region and cooperates with the first series of measurement marks to assist a user in measuring distances along the first edge. Additionally, an attachment portion is disposed in the second measurement region and is configured to hold the instrument in a conventional binder.

According to a further aspect of the invention, a drawing instrument suitable for drawing angles comprises a plate having a circular opening and a dial rotatably mounted in the circular opening. The dial has an elongated radial slot extending from a center point of the dial such that one end of the slot remains at the center point. The slot has at least one straight edge to permit marking of straight lines on a writing surface disposed beneath the drawing instrument by placing a writing implement into the slot and tracing along the straight edge. This provides a method of drawing of angles by drawing a line in the slot, rotating the dial, and drawing another line in the slot.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENT

Figure 1:
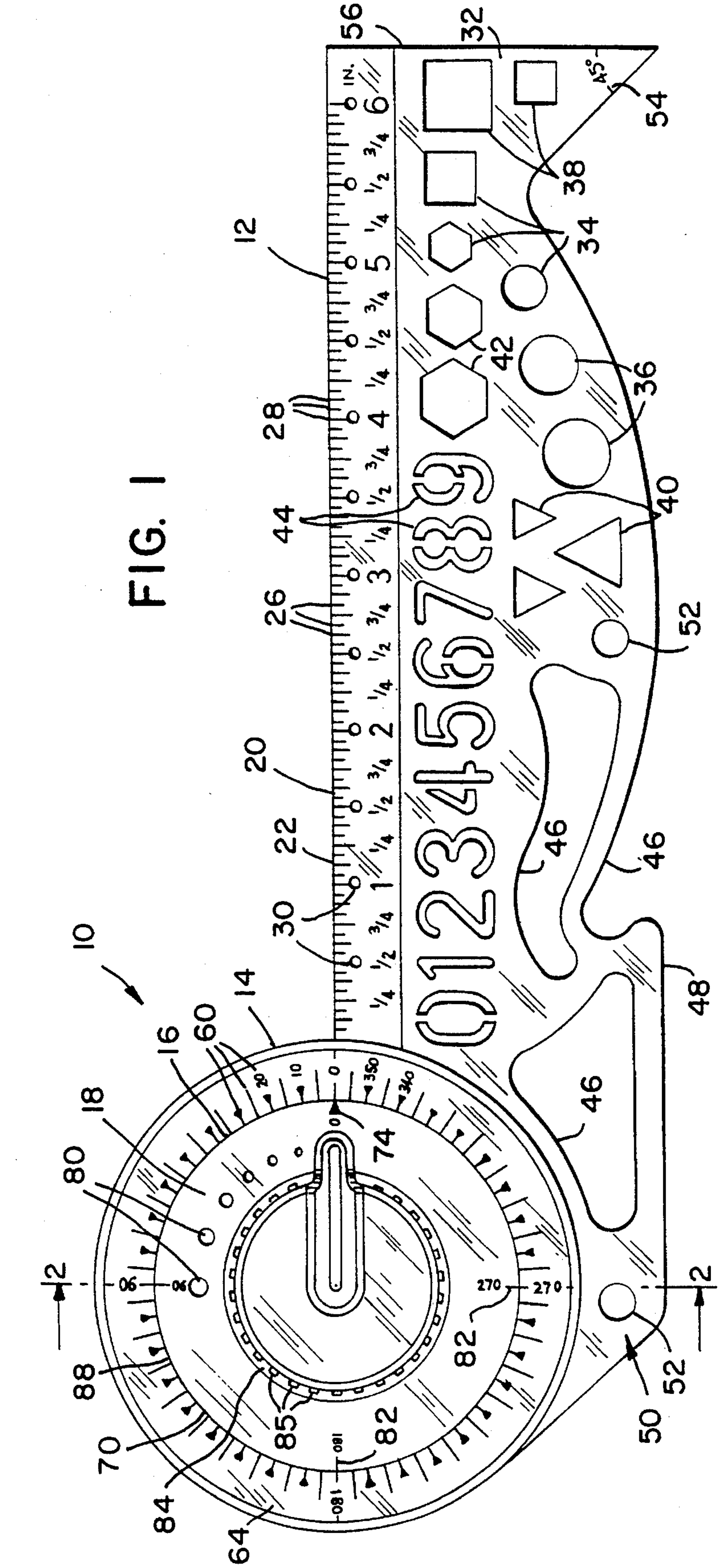
FIG. 1 is a top view of a measuring and drawing instrument according to a preferred form of the present invention.

A preferred embodiment of a measuring and drawing instrument 10, according to the present invention, is illustrated in FIG. 1. Instrument 10 is designed to perform numerous drawing and measuring functions in a way that makes instrument 10 easy to use and easy to understand. The overall layout of instrument 10 is specifically designed so the scales and marks can be read and understood even by a child learning the basics of drawing, measuring, or creating various lines, angles, arcs, circles, or shapes.

Referring generally to FIG. 1, instrument 10 includes an elongated plate 12 and a protractor plate 14 attached to elongated plate 12 at one end thereof. Protractor plate 14 preferably lies in the same plane as elongated plate 12 and includes a circular center opening 16 in which a center dial 18 is rotatably received. In a preferred embodiment, protractor plate 14 is circular in shape and integrally formed with elongated plate 12, although it could be made in a variety of shapes and configurations without departing from the scope of the invention.

Similarly, elongated plate 12 could take a variety of shapes and configurations, but a preferred embodiment will now be described with reference to FIGS. 1–3. Elongated plate 12 includes a measurement zone 20 having a straight edge 22. The straight edge 22 allows a person using instrument 10 to mark straight lines on a surface with a marking instrument (not shown) such as a pencil, pen, or marker. Measurement zone 20 also includes a series of visible gradations 26 disposed along measurement zone 20 in proximity to straight edge 22. Visible gradations 26 are preferably measurement marks (lines) 28 demarking units of measurement. For instanced in the embodiment illustrated measurement marks 28 are placed every 16th of an inch along measurement zone 20. Some of these measurement marks 28 are labeled as to their position in inches along measurement zone 20, e.g. ¼ inch, ½ inch, 1 inch, and 3 inch.

Additionally, elongated plate 12 includes a plurality of holes 30 extending therethrough, preferably in measurement zone 20. By inserting a writing instrument, such as a pencil, into one of the holes 30 and moving elongated plate 12 while holding center dial 18 at a fixed position on the writing surface, constant radius arcs or circles can be drawn. Holes 30 can be placed at a variety of locations in elongated plate 12 or even through center dial 18, but it is preferred that they are located proximate selected measurement marks 28. For example, a hole 30 could be placed approximately every ½ inch along measurement zone 20. If holes 30 are formed through center dial 18, then constant radius arcs or circles can be formed by holding elongated plate 12 in a fixed position and rotating center dial 18 with a writing instrument placed in one of the holes 30.

In this illustrated embodiment, elongated plate 12 also includes a template region 32 having a variety of openings 34 extending therethrough. Openings 34 can have many shapes, including geometric shapes such as circles 36, rectangles 38, triangles 40, or hexagons 42. A plurality of character openings 44, in the form of letters or digits, is also preferably formed through elongated plate 12 in template region 32. All of these openings are designed to assist the user in drawing characters or geometric figures. Additionally, a person using instrument 10 can draw complex curves by using any of a variety of curve guides 46 formed either through elongated plate 12 or along a second edge 48, disposed generally opposite straight edge 22.

An attachment portion 50 is also disposed on elongated plate 12 and preferably includes attachment holes 52 disposed in proximity to second edge 48. Attachment holes 52 are appropriately spaced to receive the rings of a standard ring binder. Thus, instrument 10 can be firmly held in a ring binder and transported with other drawing materials, such as a pad of paper on which lines, shapes, and angles are created. Additionally, a straight edge at one end of one of the curve guides 46 may form an angle 54 with a straight end 56 of elongated plate 12. Angle 54 is of a desired predetermined common size, such as 45°.

Protractor plate 14 is affixed to elongated plate 12 and typically molded as a single unit with elongated plate 12, although these components could be made separately. Circular center opening 16 is defined by a circular edge 58 (see FIG. 2). A series of indicator marks 60 are disposed in spaced relationship to one another in proximity to circular edge 58. In the illustrated embodiment, indicator marks 60 denote degrees of a circle.

Figure 2:
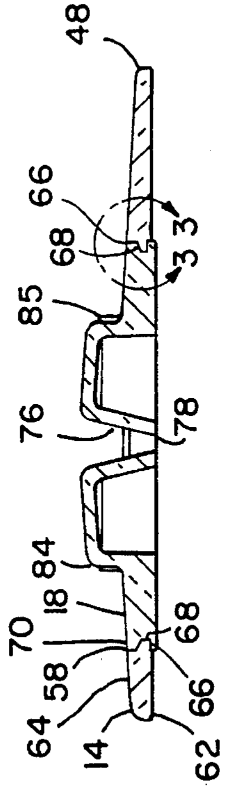
FIG. 2 is a cross-sectional view taken generally along line 2—2 of FIG. 1.

As shown in FIG. 2, protractor plate 14 includes a bottom surface 62 and a top surface 64. Indicator marks 60, including any numeric representation such as the degrees of a circle, can be located on top surface 64 or bottom surface 62. However, protractor plate 14 preferably comprises a substantially transparent plastic material, and indicator marks 60 are located on bottom surface 62, allowing observation of indicator marks 60 by looking toward top surface 64. Top surface 64 may be convex to magnify indicator marks 60 or marks on the writing surface.

Figure 3:
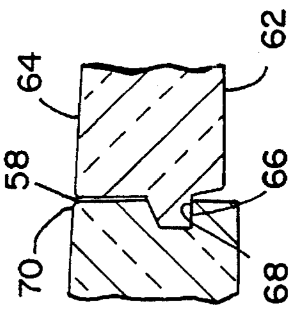
FIG. 3 is an enlarged view of a portion of the cross-sectional view shown in FIG. 2.

As shown in FIGS. 2 and 3, circular edge 58 includes a ridge or tongue 66 which is configured to receive center dial 18 in a manner that allows center dial 18 to be rotated within protractor plate 14. Preferably, ridge 66 is engaged with a groove 68 disposed about an outer periphery 70 of center dial 18. Thus, ridge 66 cooperates with groove 68 in a tongue and groove configuration to allow center dial 18 to be freely rotated within protractor plate 14. However, center dial 18 and protractor plate 14 could be rotatably connected in a variety of ways and the tongue and groove arrangement could be interchanged, i.e. ridge 66 could be formed on center dial 18 and groove 68 could be formed along circular edge 58 of protractor plate 14.

Center dial 18 is configured to allow a person using instrument 10 to easily draw and measure angles. Center dial 18 rotates about a center point 72 and also includes an alignment mark 74 disposed in proximity to outer periphery 70. Alignment mark 74 is preferably an arrow shaped indicator which can be aligned with selected indicator marks 60 disposed on protractor plate 14. An elongated slot 76 is disposed axially through center dial 18 and extends from center point 72 toward alignment mark 74, preferably into close proximity with alignment mark 74. Elongated slot 76 includes at least one generally straight guide edge 78 to facilitate the marking of generally straight lines intermediate center point 72 and outer periphery 70 on the writing surface. Thus, angles may easily be drawn without separately marking points and then drawing lines between the points as with a conventional protector. For example, if the person using instrument 10 desires to draw a 30 degree angle, this can be accomplished by simply drawing two lines through elongated slot 76. First, alignment mark 74 is aligned with the indicator mark 60 labeled as 0 degrees and a first line is drawn through elongated slot 76. Center dial 18 is then rotated until alignment mark 74 is aligned with the indicator mark 60 labeled as 30 degrees. Here, a second line is drawn through elongated slot 76 to create a 30 degree angle on the writing surface.

Center dial 18 also includes visual angle indicators 80, such as the illustrated dots which increase in diameter between alignment mark 74 (located at approximately 0 degrees on dial 18) and the 90 degree point on center dial 18. This provides a graphic representation of increasing angle size and is particularly helpful to children learning to draw and measure angles. Preferably, center dial 18 also includes a plurality of marks 82 labeled at their particular position on center dial 18, for instance, 90 degrees, 180 degrees, and 270 degrees.

In the preferred embodiment, center dial 18 includes a raised handle portion 84 that extends upwardly from center dial 18. Handle portion 84 includes a series of ridges 85 that facilitate the grasping of center dial 18 so it may be rotated. Handle portion 84 can take a variety of forms, although it preferably is substantially circular and disposed within the outer periphery 70 of center dial 18. In this configuration, elongated slot 76 extends partially through handle portion 84 in the radial direction and completely through handle portion 84 in the axial direction.

Figure 4:
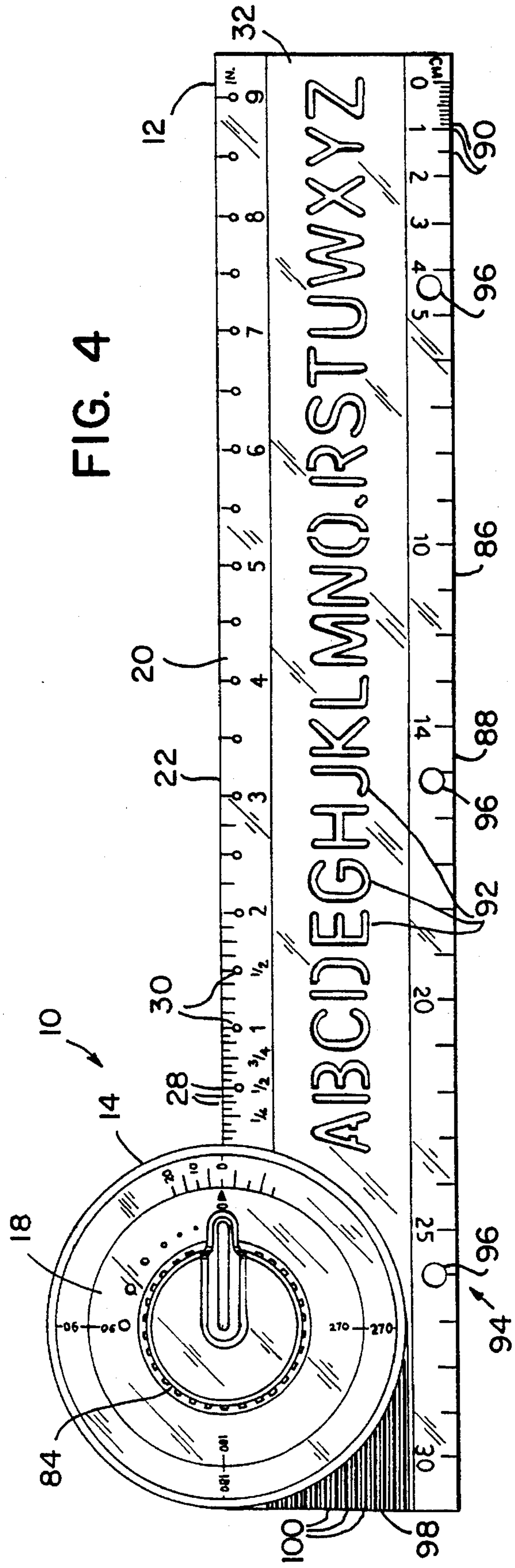
FIG. 4 is a top view of an alternate embodiment of the instrument according to the present invention.
Figure 5:
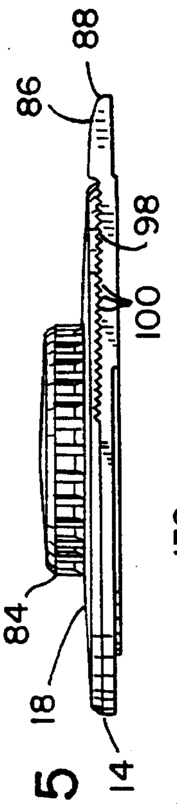
FIG. 5 is an end view of the alternate embodiment shown in FIG. 4.

An alternate embodiment of instrument 10 is illustrated generally in FIGS. 4 and 5. This embodiment includes protractor plate 14 and center dial 18 as described with reference to FIGS. 1–3. However, differences exist with respect to elongated plate 12. In addition to having measurement zone 20 and straight edge 22, this embodiment includes a second measurement zone 86 disposed opposite measurement zone 20. Second measurement zone 86 includes a straight edge 88 to facilitate the drawing of straight lines. A plurality of alternate measurement marks 90 extend into proximity with straight edge 88. Alternate measurement marks 90 represent a measurement scale similar to that illustrated in measurement zone 20 but having different units of measurement. For example, measurement zone 20 and measurement marks 28 may indicate inches, while second measurement zone 86 and alternate measurement marks 90 represent centimeters.

In this alternate embodiment, template region 32 tends to be narrower due to the presence of two measurement zones, 20 and 86. A plurality of openings 92, such as letters or numerals, can be formed through template region 32. Additionally, an attachment portion 94 is preferably formed in second measurement zone 86 and may include a plurality of holes 96 therethrough. Holes 96 are appropriately staggered to be received by a binder, such as a standard three ring binder.

A gripping portion 98 having an uneven surface is disposed between measurement zone 20 and second measurement zone 86. Gripping portion 98 includes a plurality of ridges 100 which allow a person using this instrument to hold it in place during various drawing and measuring exercises.

Figure 6:
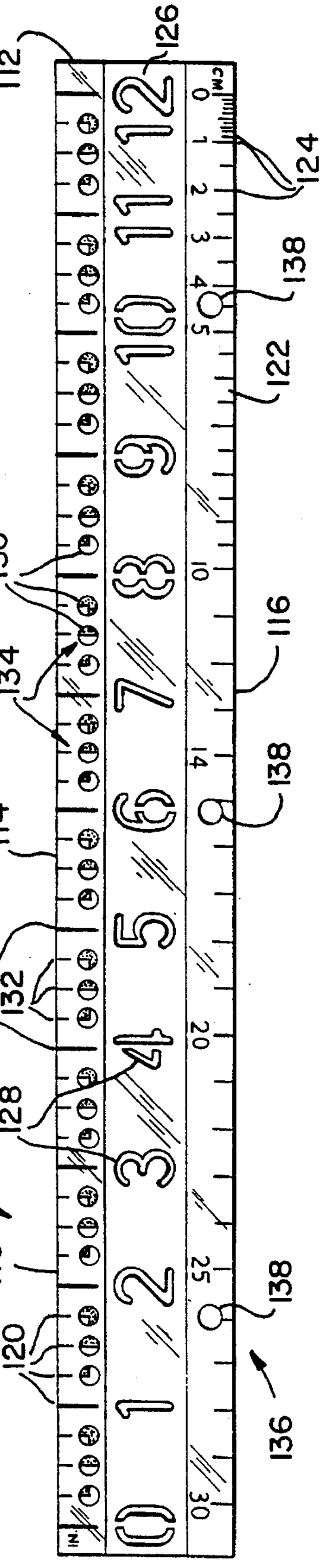
FIG. 6 is another alternate embodiment of an instrument according to the present invention.

Another preferred embodiment of the invention is illustrated generally in FIG. 6. This embodiment is a drawing and measuring instrument 110 for measuring distances and drawing straight lines. Instrument 110 includes a thin, elongated plate member 112 having a first generally straight edge 114 and a second generally straight edge 116 opposite edge 114. First edge 114 borders a first measurement region 118 which includes a first series of measurement marks 120 that are separated by spaces along first measurement region 118. Similarly, second edge 116 borders a second measurement region 122 that includes a second series of measurement marks 124 also separated by spaces along second measurement region 122. Preferably, the first series of measurement marks 120 are spaced differently from the second series of measurement marks 124 and will typically represent different standard units of measurement.

Located between first measurement region 118 and second measurement region 122 is an intermediate zone 126 which includes a plurality of template openings, such as characters 128. Preferably, characters 128 are numerals corresponding to the primary units of measurement in first measurement region 118. Characters 128 may either be solid or open and extending through elongated member 112 to serve as guides for the drawing of such characters.

Each character 128 is generally aligned with one of the measurement marks 120. Preferably, the marks corresponding to characters are larger marks 130 reflecting each standard unit of measurement along first measurement region 118. Between each pair of larger marks 130, a plurality of smaller marks 132 indicate fractional positions between the larger marks. For example, in the embodiment illustrated, larger marks 130 appear every inch along first measurement region 118, while smaller marks 132 indicate each quarter inch interval between the consecutive pairs of larger marks 130.

A series of spaced visual symbols 134 are located in first measurement region 118 and cooperate with measurement marks 120 to provide a graphic representation of the position of such marks. This assists a person using instrument 110 in measuring distances along first straight edge 114. Visual symbols 134 preferably comprise geometric shapes, preferably circles. Each geometric shape is appropriately shaded to visually signify its position along first measurement region 118.

The geometric shapes 136 preferably provide an indication of the position of each smaller mark 132 between each pair of larger marks 130. For example, three smaller marks 132 are located between the larger marks 130 found at the two inch and three inch position and represent quarter inch intervals. The first quarter inch mark is in proximity to one geometric shape 136 that is shaded one quarter full. Similarly, the second quarter inch mark is in proximity to one geometric shape 136 shaded half full. Finally, the third quarter inch mark is in proximity to another geometric shape 136 shaded three quarters full. Thus, someone learning to draw and measure can quickly recognize the concept of quarter, half, and three-quarter increments between standard units of measurement. Preferably, the geometric shapes are circular and the shaded regions are pie-sections.

Instrument 110 also includes an attachment portion 136 having a plurality of holes 138 disposed through second measurement region 122. Holes 138 are evenly spaced to receive the rings of a conventional binder.

It will be understood that the foregoing description is of preferred exemplary embodiments of this invention and that the invention is not limited to the specific forms shown. For example, the elongated plates can take a variety of configurations; different shapes can be used in the template regions; a variety of characters can be used; other units of measurement can be used in the measurement zones; and various methods of attachment can be used to rotatably attach the center dial to the protractor plate or the dial may be made readily removable by lifting it out of its aperture. These and other modifications may be made in the design and arrangement of the elements without departing from the scope of the invention as expressed in the appended claims.

We claim:

1. An instrument for measuring and for drawing straight lines, the instrument comprising an elongated plate having a first generally straight edge and a second generally straight edge opposite and parallel to the first edge, the instrument further comprising:

a first measurement region disposed along the first generally straight edge and including a first series of measurement marks separated by spaces along the first measurement region;

a second measurement region disposed along the second generally straight edge and including a second series of measurement marks different from the first series and separated by spaces along the second measurement region; and a series of visual symbols disposed in linear arrangement along a single line in the first measurement region and cooperating with the first series of measurement marks to assist a user in measuring distances along the first edge, wherein the series of visual symbols comprises consecutive geometric shapes, each geometric shape having a portion appropriately shaded to visually signify its position along the first measurement region.

2. The instrument of claim 1, wherein the first series of measurement marks includes a plurality of large marks and a plurality of small marks, the large marks being disposed at one inch intervals, while the small marks are disposed between the large marks at quarter inch intervals, further wherein three geometric shapes are disposed between each pair of consecutive large marks in proximity with corresponding small marks.

3. The instrument of claim 2, wherein the geometric shapes are circular and the shaded regions are pie-sections.

4. The instrument of claim 1, further comprising one or more attachment holes through the plate appropriately spaced to be received in a conventional three-ring binder.

5. An instrument for measuring and for drawing straight lines, the instrument comprising an elongated plate having a first generally straight edge and a second generally straight edge opposite and parallel to the first edge, the instrument further comprising:

a first measurement region disposed along the first generally straight edge and including a first series of measurement marks separated by spaces along the first measurement region;

a second measurement region disposed along the second generally straight edge and including a second series of measurement marks different from the first series and separated by spaces along the second measurement region;

a series of visual symbols disposed generally in linear arrangement along a single line and located in at least one of the measurement regions, the visual symbols each being of a geometric shape and having a predetermined portion of the geometric shape altered in a visually perceptible manner, the predetermined portion of a selected visual symbol corresponding to the position of the visual symbol along the at least one of the measurement regions; and a plurality of template openings disposed generally between the first and second measurement regions.

6. The instrument as recited in claim 5, wherein at least some of the template openings are in the form of numerals.

7. The instrument as recited in claim 5, wherein the first measurement region includes measurement marks at one inch intervals along the first measurement region and the second measurement region includes measurement marks at one centimeter intervals along the second measurement region.

8. The instrument as recited in claim 7, wherein the visual symbols are disposed intermediate the measurement marks located at one inch intervals along the first measurement region and each predetermined portion represents the corresponding quarter inch interval.

9. The instrument as recited in claim 5, wherein the first series of measurement marks includes a plurality of large marks and a plurality of small marks, the large marks being disposed at one inch intervals, while the small marks are disposed between the large marks at quarter inch intervals, further wherein three geometric shapes are disposed between each pair of consecutive large marks in proximity with corresponding small marks.

10. The instrument as recited in claim 9, wherein the geometric shapes are circular and the shaded regions are pie-sections.

11. The instrument as recited in claim 9, further comprising one or more attachment holes through the plate appropriately spaced to be received in a conventional three-ring binder.

* * * * *